(12) United States Patent
Guthrie et al.

(10) Patent No.: US 8,910,125 B2
(45) Date of Patent: Dec. 9, 2014

(54) MONITORING SOFTWARE PERFORMANCE

(71) Applicant: International Business Machines Corporation, Armonk, NY (US)

(72) Inventors: Guy L Guthrie, Austin, TX (US); Randall R Heisch, Georgetown, TX (US); Venkat R Indukuru, Austin, TX (US); Aaron C Sawdey, Cannon Falls, MN (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/629,380

(22) Filed: Sep. 27, 2012

(65) Prior Publication Data

US 2014/0089902 A1   Mar. 27, 2014

(51) Int. Cl.
G06F 9/44 (2006.01)

(52) U.S. Cl.
USPC .......................... 717/128; 717/130; 717/131

(58) Field of Classification Search
None
See application file for complete search history.

(56) References Cited

U.S. PATENT DOCUMENTS

| | | | | |
|---|---|---|---|---|
| 5,842,017 A * | 11/1998 | Hookway et al. | ............ | 717/128 |
| 6,564,175 B1 * | 5/2003 | Hady et al. | ............ | 717/131 |
| 6,584,491 B1 * | 6/2003 | Niemi et al. | ............ | 709/202 |
| 7,360,218 B2 | 4/2008 | Accapadi et al. | | |
| 7,421,681 B2 * | 9/2008 | DeWitt et al. | ............ | 717/128 |
| 7,512,954 B2 * | 3/2009 | Srivastava et al. | ........... | 719/318 |
| 7,779,238 B2 * | 8/2010 | Kosche et al. | ............ | 717/130 |
| 7,930,600 B2 | 4/2011 | Borelli et al. | | |
| 7,962,314 B2 * | 6/2011 | Chernoff | ............ | 717/130 |
| 8,032,875 B2 * | 10/2011 | Kosche et al. | ............ | 717/130 |
| 8,042,102 B2 * | 10/2011 | DeWitt et al. | ............ | 717/128 |
| 8,136,124 B2 * | 3/2012 | Kosche et al. | ............ | 717/130 |
| 8,166,462 B2 * | 4/2012 | Kosche et al. | ............ | 717/130 |
| 8,176,475 B2 * | 5/2012 | Kosche et al. | ............ | 717/128 |
| 8,307,346 B2 * | 11/2012 | Lev et al. | ............ | 717/131 |
| 8,375,368 B2 * | 2/2013 | Tuck et al. | ............ | 717/131 |
| 2003/0135720 A1 * | 7/2003 | DeWitt et al. | ............ | 712/228 |
| 2004/0123084 A1 * | 6/2004 | DeWitt et al. | ............ | 712/227 |
| 2007/0250820 A1 * | 10/2007 | Edwards et al. | ............ | 717/131 |
| 2008/0127107 A1 * | 5/2008 | Kosche et al. | ............ | 717/128 |
| 2008/0127120 A1 * | 5/2008 | Kosche et al. | ............ | 717/131 |
| 2008/0155339 A1 * | 6/2008 | Lowe et al. | ............ | 714/38 |
| 2008/0256396 A1 * | 10/2008 | Giannini et al. | ............ | 714/45 |
| 2009/0217103 A1 | 8/2009 | Borelli et al. | | |

OTHER PUBLICATIONS

Zhao, et al., "Dynamic Cache Contention Dection in Multi-threaded Applications"; 2011 ACM; [retrieved on Feb. 27, 2014]; Retrieved from Internent <URL:http://dl.acm.org/citation.cfm?id=1952688>; pp. 27-37.*

(Continued)

*Primary Examiner* — Xi D Chen
(74) *Attorney, Agent, or Firm* — Yudell Isidore PLLC; Steven L. Bennett

(57) ABSTRACT

Systems, methods and computer program products may provide monitoring of software performance on a computer. A method of monitoring software performance in a computer may include marking at least one of a load request and a store request, the marked request including an effective instruction address and an effective data address, recording the effective instruction and data addresses in a processor core and sending the marked request to a memory subsystem. The method may also include receiving a fabric response for the marked request, recording the fabric response in the core and tying the effective instruction and data addresses and the fabric response together in a sample.

18 Claims, 6 Drawing Sheets

(56) References Cited

OTHER PUBLICATIONS

Azimi, Erickson, "A Software Approach to Multiprocessor Address Trace Generation", 1990 IEEE;[retrieved on Feb. 27, 2014]; Retrieved from Internent <URLhttp:/eeexplore.ieee.org/stamp/stamp.jsp?tp=&arnumber=139335:>; pp. 99-105.*

Koehler, et al., "Platform-Aware Bottleneck Detection for Reconfigurable Computing Applications", 2011, ACM; [retrieved on Jul. 25, 2014]; Retrieved from Internet <URL:http://dl.acm.org/citation.cfm?id=2000832>;pp. 30-57.*

Johnson, et al., "Decoupling Contentino Management from Scheduling"; 2010 ACM; [retrieved on Jul. 25, 2014]; Retrieved from Internet <URL:http://dl.acm.org/citation.cfm?id=1736020>;pp. 117-128.*

Dasari, et al., "Response Time Analysis of COTS—Based Multicores Considering the Contention on the Shared Memory Bus"; 2011 IEEE; [retrieved on Jul. 25, 2014]; Retrieved from Internet <URL:http://ieeexplore.ieee.org/stamp/stamp.jsp?tp=&arnumber=6120939>;pp. 1068-1075.*

Kodi, Louri, "Design of a High-Speed Optical Interconnect for Scalable Shared Memory Multiprocessors"; 2004 IEEE; [retrieved on Jul. 25, 2014]; Retrieved from Internet <URL:http://ieeexplore.ieee.org/stamp/stamp.jsp?tp=&arnumber=1375210>;pp. 92-97.*

IBM, Correlating request and response processing for asynchronous service interactions, Jan. 24, 2007, 2 pages.

* cited by examiner

MONITORING SOFTWARE PERFORMANCE

BACKGROUND

The present invention relates to monitoring software performance, and more specifically, to monitoring software performance including marking one of a load request and a store request, and tying one or more of an effective instruction and data addresses and an fabric response together in a sample.

Causes of contention issues on an inter-processor connection fabric are difficult to identify in a precise and accurate fashion. Looking for long-latency loads and stores may be inexact because there are many things that can happen that will cause latency to increase. For example, contention for resources in the memory controller, access to distant data within the system, and contention for address and data pathways between the requester and the source of the data. Processor cycle or instruction profiling may be used to reveal that time is being spent in locking routines but this does not provide data regarding cause for the delay. Finally, fabric traces, and analyzing for lock contention, are cumbersome to take on lab machines and generally not an option for customer machines. In addition, correlating the physical real address on the fabric trace back to a particular effective address in a process in an operating system image is a very difficult process. Further, the instruction address of the code that caused the contended address is not available.

BRIEF SUMMARY

According to one embodiment of the present invention, a method of monitoring software performance in a computer is provided. The method may include marking at least one of a load request and a store request, the marked request including an effective instruction address and an effective data address, recording the effective instruction and data addresses in a processor core and sending the marked request to a memory subsystem. The method may also include receiving a fabric response for the marked request, recording the fabric response in the core and tying the effective instruction and data addresses and the fabric response together in a sample.

In some embodiments, the fabric response may include at least one of a combined response, a retry count, a latency count, a transaction type (T-type), data source and a data system reference code (SRC). Additionally and/or alternatively, the fabric response may be recorded in a performance monitoring unit. Additionally and/or alternatively, the effective instruction address may be recorded in a first special purpose register and/the effective data address may be recorded in a second special purpose register.

Some embodiments of the method may additionally include determining, based on the sample, a contention issue of the marked request. Additionally and/or alternatively, the method may include identifying a location and a type of a contention issue. Additionally and/or alternatively, the method may include raising an interrupt of the marked request in response to the received fabric response.

According to a further embodiment of the present invention, a computer program product for monitoring software performance in a computer is provided. The computer program product may include at least one computer readable storage medium having computer readable program code embodied therewith. The computer readable program code, when read by a processor, may be configured to mark at least one of a load request and a store request, the marked request including an effective instruction address and an effective data address, record the effective instruction and data addresses in a processor core and send the marked request to a memory subsystem. The computer readable program code may be further configured to receive a fabric response for the marked request, record the fabric response in the core and tie the effective instruction and data addresses and fabric response together in a sample.

According to a further embodiment of the present invention, a computer program product for monitoring software performance in a computer is provided. The computer may include a processor, a memory and a software performance monitoring program including a plurality of instructions stored in the memory that are executed by the processor. The plurality of instructions may include instructions that are executed by the processor to mark at least one of a load request and a store request, the marked request including an effective instruction address and an effective data address, record the effective instruction and data addresses in a processor core and send the marked request to a memory subsystem. The plurality of instructions may further include instructions that are executed by the processor to receive a fabric response for the marked request, record the fabric response in the core and tie the effective instruction and data addresses and fabric response together in a sample.

The plurality of instructions may further include instructions that are executed by the processor to determine, based on the sample, at least one of a location and a type of a contention issue of the marked request. The plurality of instructions may further include instructions that are executed by the processor to start a latency count in the processor and stop the latency count in the processor.

DETAILED DESCRIPTION

Figure 1:
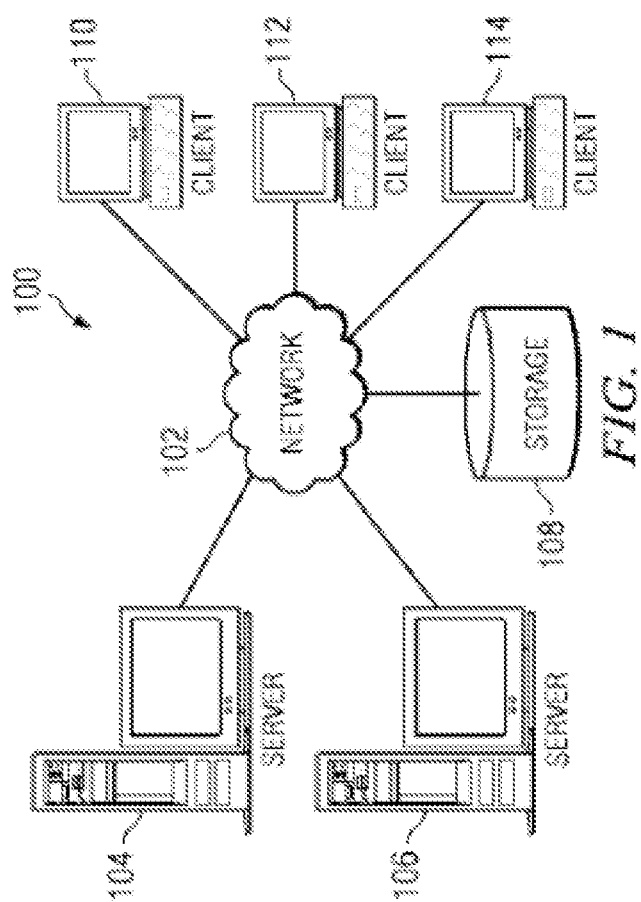
FIG. 1 is a pictorial representation of an example of a computer system in which illustrative embodiments may be implemented.

Identifying the causes of contention issues on an inter-processor connection fabric in a precise and accurate fashion, which is for example easily accessible to programmers through standard tools will help them produce software that has better scaling characteristics. This is important because scaling up to large numbers of cores and threads is an important selling point for some computer systems and very important for cloud computing platforms.

This invention helps to precisely identify the code and data addresses of locks/atomic updates and other contention across threads that are causing contention on the inter-processor connection fabric. In particular, this invention can accurately identify which locking code sequences and which data structures are involved in the locks that are causing problems. Additionally and/or alternatively, the present invention may distinguish between problems related to locking and other problems that may cause poor scaling but are in fact unrelated to the locking, as explained in further detail below.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF cable, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or server, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
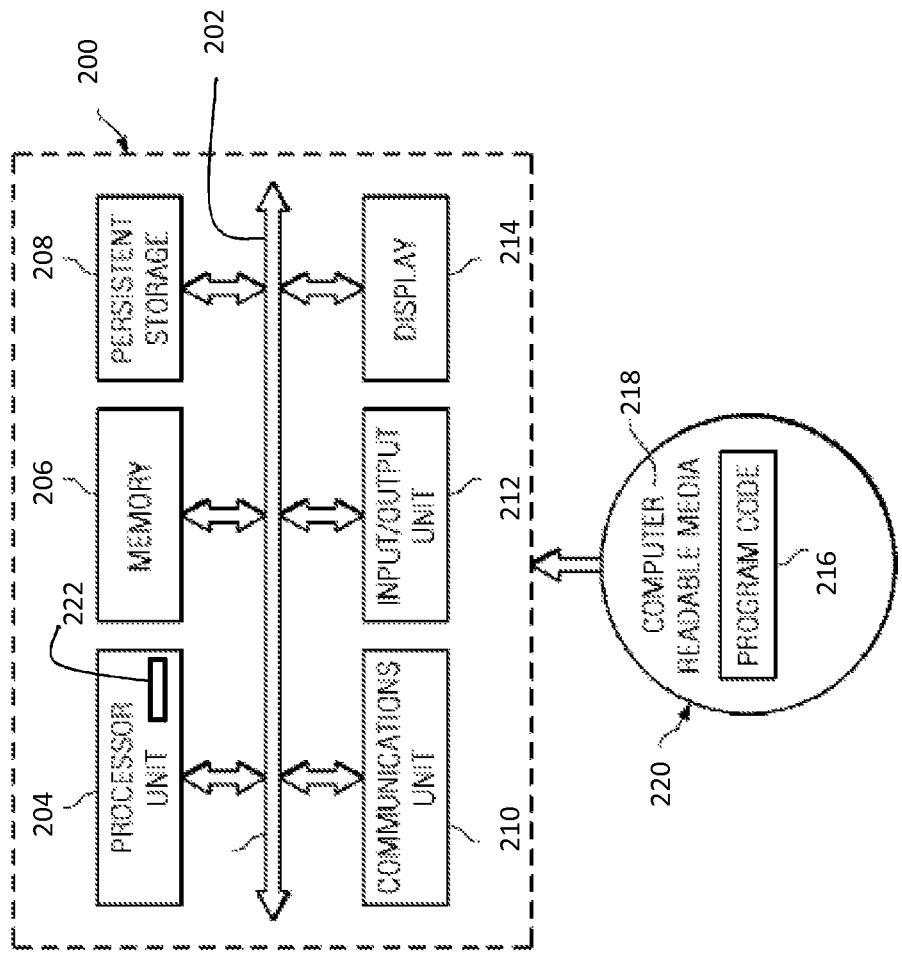
FIG. 2 is a block diagram of an example of a computer in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a computer system, indicated generally at 100, and including a network of computers in which illustrative embodiments may be implemented. Computer system 100 may contain a network 102, which is the medium used to provide communications links between various devices and computers connected together within computer system 100. Network 102 may include connections, such as wire, wireless communication links, or fiber optic cables.

In the depicted example, a server 104 and a server 106 may connect to network 102 along with a storage unit 108. In addition, a first client computer 110, a second client computer 112, and a third client computer 114 may connect to network 102. Client computers 110, 112, and 114 may be, for example, personal computers or network computers and/or may also be referred to as nodes. In the depicted example, server 104 may provide data, such as boot files, operating system images, and/or software applications to client computers 110, 112, and 114. Computer system 100 may include additional servers, clients, and other devices not shown, or may include fewer devices than those shown.

In the depicted example, network 102 may include the Internet. Computer system 100 also may be implemented with a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system 200 is shown in which illustrative embodiments may be implemented. Data processing system 200 is an example of a computer, such as server 104 or client computer 110 in FIG. 1, in which computer-usable program code or instructions implementing the processes may be located for the illustrative embodiments. In this illustrative example, data processing system 200 may include a communications fabric 202 that may provide communications between two or more of a processor unit 204, a memory or memory subsystem 206, a persistent storage 208, a communications unit 210, an input/output (I/O) unit 212, and display 214. Additionally and/or alternatively, fabric 202 may include an interconnection network connecting one or more chips each containing one or more processor cores and/or i/o interfaces. In other examples, a data processing system may include more or fewer devices.

Processor unit 204 may serve to execute instructions for software that may be loaded into memory 206. Processor unit 204 may include a set of one or more processors, a core 222, or may be a multi-processor core, depending on the particular implementation. Further, processor unit 204 may be implemented using one or more heterogeneous processor systems in which a main processor is present with secondary processors on a single chip. As another illustrative example, processor unit 204 may include a symmetric multi-processor system containing multiple processors of the same type.

Memory 206 and persistent storage 208 are examples of storage devices. A storage device may include any piece of hardware that is capable of storing information either on a temporary basis and/or a permanent basis. Memory 206, in these examples, may include, for example, a random access memory or any other suitable volatile or non-volatile storage device. Persistent storage 208 may take various forms depending on the particular implementation. For example, persistent storage 208 may include one or more components or devices. For example, persistent storage 208 may include a hard drive, a flash memory, a rewritable optical disk, a rewritable magnetic tape, or some combination of the above. The media used by persistent storage 208 also may be removable. For example, a removable hard drive may be included in persistent storage 208.

Communications unit 210, in these examples, may provide communications with other data processing systems or devices. For example, communications unit 210 may include a network interface card. Communications unit 210 may provide communications through the use of either or both physical and wireless communications links.

Input/output unit 212 may allow for input and output of data with other devices that may be connected to data processing system 200. For example, input/output unit 212 may provide a connection for user input through a keyboard and mouse. Further, input/output unit 212 may send output to a printer. Display 214 may display information to a user.

Instructions for the operating system and applications or programs may be located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 may be located in a functional form on a computer-readable media 218 that is selectively removable and may be loaded onto or transferred to data processing system 200 for execution by processor unit 204. One or both of program code 216 and computer-readable media 218 may be included in a computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in tangible forms.

In some examples, communications fabric 202 may include a bus system and may be comprised of one or more buses, such as a system bus or an input/output bus. Of course, the bus system may be implemented using any suitable type of architecture that provides for a transfer of data between different components or devices attached to the bus system. Additionally, communications unit 210 may include one or more devices used to transmit and receive data, such as a modem or a network adapter. Further, memory 206 may include one or more of a memory, a buffer and/or one or more cache level(s) such as found in an interface and a memory controller hub that may be present in communications fabric 202.

Monitoring software performance in a computer may accurately correlate fabric responses to program code to identify contention issues. In some methods of monitoring software performance, a thread or an instruction may be tagged and its effective instruction and data addresses may be recorded in a processor core. While the thread is pending, one or more fabric response(s) for the tagged thread may be forwarded to the processor core. The processor core may record the effective addresses and fabric response(s) of the tagged thread to a buffer or a memory. The effective addresses and fabric response(s) of the tagged thread may be post processed to find any contention issue(s). For example, the effective addresses and fabric response(s) may be tied together in a sample. One or both of a location and a type of contention issue may be determined based on the sample. The method may also include finding a specific response from the fabric or counting responses and raising an interrupt in response to the fabric responses, for example when a response threshold is reached.

For example, in a computer having a load/store architecture, also known as a reduced instruction set computer (RISC), a method for precisely correlating system connectivity fabric responses to program code to identify thread contention issues may include tagging load and/or store requests and recording the effective instruction and data addresses of the tagged load and store requests in a core, for example in specified registers. The method may further include, while a tagged load or store request is pending, forwarding fabric responses for the tagged load/store request to the core, for example a performance monitoring unit in the core, and recording the effective addresses and fabric responses for the tagged load or store request such that the fabric responses can be post processed to locate contention issues. For example, the effective addresses and fabric response(s) may be tied together in a sample. One or both of a location and a type of contention issue may be determined based on the sample. The method may also include finding a specific response from the fabric or counting responses and raising an interrupt in response to the fabric responses, for example when a response threshold is reached.

Additionally and/or alternatively, a method may include tagging loads and/or stores and recording the tagged load/store effective instruction and data addresses in a core in special purpose registers. While the load or store is pending in a nest, an L2cache may forward one or more fabric responses for the tagged load/store to a performance monitoring unit located in the core. The monitoring unit may record the effective addresses and fabric responses to a buffer or save it to a memory.

The fabric response(s) may be post processed to find a contention issue(s). For example, the effective addresses and fabric response(s) may be tied together in a sample. One or both of a location and a type of contention issue may be determined based on the sample. The method may also include finding a specific response from the fabric or counting responses and raising an interrupt in response to the fabric responses, for example when a response threshold is reached.

As discussed in further detail below, a fabric response may include one or more of a combined response, a retry count, a latency count, a transaction type (T-type), data source and/or a data system reference code (SRC). In some embodiments, the fabric response may include includes at least two of a combined response, a retry count, a latency count, a transaction type (T-type), data source and a data system reference code (SRC).

Figure 3:
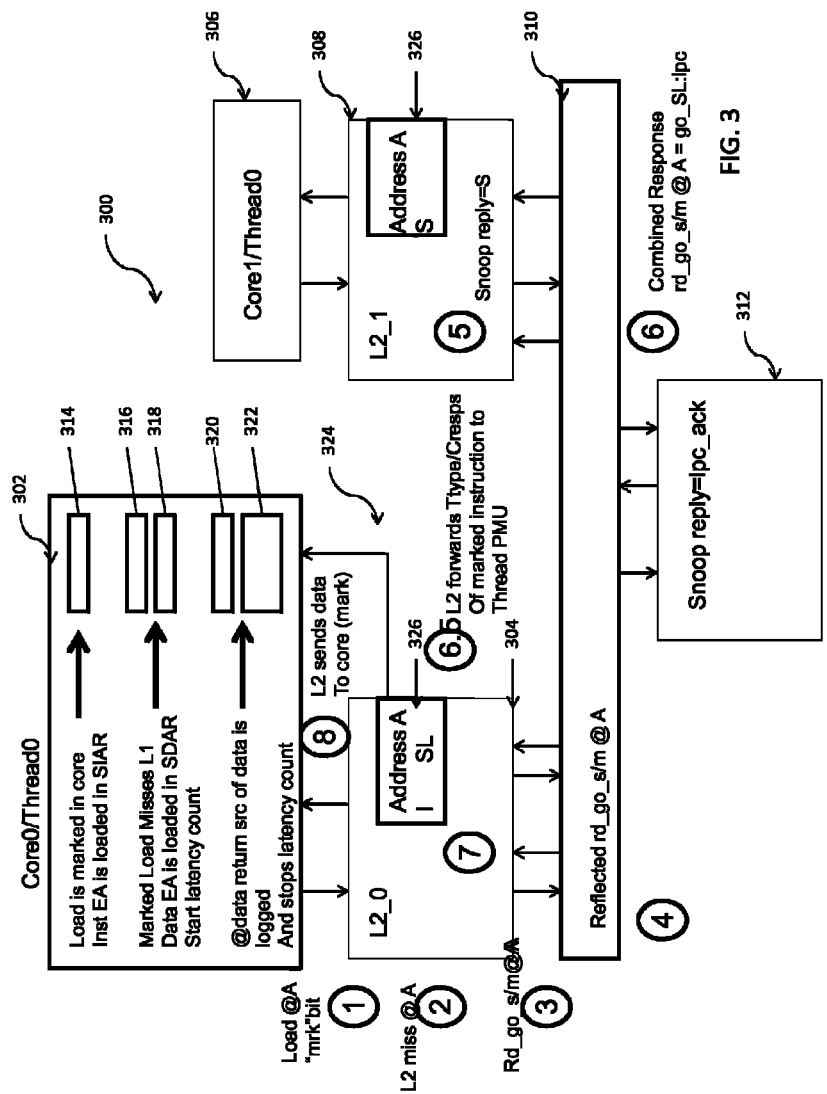
FIG. 3 is a flowchart of correlating fabric activity to effective address space using a load operation in a computer.

Turning now to FIG. 3, an example flowchart of correlating fabric activity to effective address space using a basic load operation in a computer 300 is shown. Though a load operation is shown, the flowchart also applies to a store operation, instruction operation and/or any thread operation known to those skilled in the art. Computer 300 may include a first processor core 302, an associated first L2 cache 304, a second processor core 306, an associated second L2 cache 308, fabric 310 and/or a memory 312.

A load may be tagged, also referred to herein as marked or sampled, in first processor core 302. In some embodiments, the load may be tagged randomly and/or may be tagged outside of core 302. The load may be tagged by any means known to those skilled in the art. Additionally and/or alternatively, the load may be tagged at instruction dispatch, at instruction issue or finish time.

The tagged load may include an effective instruction address, also referred to as instruction EA, and an effective data address, also referred to as data EA. The instruction and data address of the tagged load may be logged or recorded in first core 302, for example in one or more special purpose registers (SPRs). The SPR(s) may be accessible by software. For example, first core 302 may include a first SPR 314, such as a Sampled Instruction Address Register (STAR), which may log the instruction effective address, and/or a second SPR 316, such as a Sampled Data Address Register (SDAR), which may log the data effective address. First core 302 may also include a monitor mode control registers (MMCRA) 318, that may be used to identify what events will be monitored to enable various performance monitor interrupt functions. First core 302 may further include one or more status registers or performance monitoring units 320 and 322, such as a Status Interrupt Enable Register (SIER), that may be available to log status indications for the tagged load and/or fabric responses such as SRC, ttype, and/or cresp. First core 302 may also include an L1 cache.

First core 302 may send the mark bit or tagged load to a nest, also referred to as a memory subsystem 324. Memory subsystem 324 may include one or caches, such as first L2 cache 304 that may be associated with first core 302, and/or memory 312. First L2 cache 304 may include one or more Read-Claim (RC) machines 326 for independently and/or concurrently servicing load and store requests received from first core 302 and/or may be responsible for resolving L1 misses. It may be apparent and/or the RC machine 326 may know it is working on a marked load.

In some embodiments, there may be only one marked instruction per thread at a time. The state machines may mark another load/store, for example, only after the previous load or store have completed both in first core 302 and memory subsystem 324.

First L2 cache 304 may check one or more L2 cache directories. If the request is a miss, first L2 cache 304 may generate a request for data to fabric 310, for example a rd_go_m/s. The fabric 310 may arbitrate this command (cmd) and may send out a reflected cmd to one or more snoopers on the computer. The snoopers may send out partial responses, for example as shown in FIG. 3, another cache has the line in the shared state and indicates it can intervene.

The fabric 310 may receive the partial response(s) and/or may generate a combined response (cresp), for example a cresp indicating that the snooper can intervene the data in a shared state. The fabric 310 may send the cresp to first L2 cache 304.

First L2 cache 304 may receive the cresp. It may be apparent and/or first L2 cache 304 may know the cresp is for a marked instruction or tagged load. First L2 cache 304 may forward or send the cresp to first core 302. First L2 cache 304 may also send an identifier of the tagged thread or instruction or load, also referred to as the thread ID, to first core 302. First L2 cache 304 may also send a data source, which may indicate which level of hierarch the cache line came from, to first core 302. First L2 cache 304 may also send a system reference code (SRC) of data to first core 302. First L2 cache 304 may also send a T-type to first core 302. First L2 cache 304 may also send one or both of a latency count and/or a retry count to first core 302. One or more of the retry count, latency count, T-type, data source, thread ID and data SRC may be sent in combination with the cresp. One or more of the cresp, retry count, latency count, T-type, data source, thread ID and/or SRC may be referred to as and/or be included in a fabric response.

First core 302 may receive the fabric response. In the example shown in FIG. 3, the fabric response includes the cresp and T-type. First core 302 may record the fabric response, for example in an SPR, such as the SIER and/or performance monitoring unit (PMU).

First core 302 may receive the requested data and/or the SRC of data. The SRC may be recorded in an SPR, such as the SIER and/or performance monitoring unit. In some embodiments, a latency count may have been started, for example in first core 302, when the marked load was sent to memory subsystem 324. The latency count may be stopped when the requested data is received at first core 302. The latency count may be recorded in an SPR, such as the SIER and/or performance monitoring unit. Additionally and/or alternatively, a hardware unit may monitor the final resolution of the marked request on the fabric and may forward the response to the core independent of (i.e. before or after) the data sent in response to the request. The hardware unit may be separate from the core.

First core 302 may the correlate the instruction and data effective addresses of the tagged load and the fabric response of the tagged load together. For example, the instruction and data effective addresses and the fabric response may be tied together in a sample. By correlating combined responses to Loads/stores, determination of exactly in code where and what type of contention issues are occurring.

Accordingly, for a marked load/store one or more of the following may be locked together: instruction effective address, data effective address, latency, data SRC, Ttype, cresp, and/or retry count. Example correlation of fabric activity to effective address space may include a profile on loads that got a T intervention, profile on stores that had to do a bkill/dclaim and/or profile on loads that suffered more than 20 retries.

For example, software post processing tools may look for patterns (examples of which are provided below) to help tune customer and/or benchmark code for contention issues.

1) Loads that get a T intervention. Because T interventions happen after combined response is done, the latency is much longer. If more than a small fraction of interventions are sourced by T states, the added latency can cause a performance problem.

If a go_S1:T response is seen, then either the data was not present in the local node (indicating poor locality), or the S1 copy in the local node either aged out of cache and was discarded (indicating cache management or cache address conflict issues).

If a go_S:T is seen, the cache that contained the S1 copy in the local node was not able to respond (indicating snoop machine utilization issues).

If a go_SL:1pc response to a rd_go_s cmd is seen, then this indicates that there are S copies of the data present in the node but the SL copy has been lost, suggesting that there are cache management or sharing pattern issues.

2) Loads that get lots of retries. Each retry adds hundreds of cycles of latency to the load request, which quickly impacts performance.

rty_ned_np which indicates conflicts on-node rty_ned_sp which indicates data was not found on-node, or that there are conflicts off-node 3) Stores that had to do a bkill. Similar to load retries, these make the stores take longer. If the store is followed by a sync, as is usually the case in a locking sequence, then the sync cannot complete until the previous stores are complete.

A store that hits a Tx state in the local cache will end up doing a bgkill on the fabric addr_ack_done resp indicates the bgkill finished successfully addr_ack_bk_np indicates that the bgkill had to be re-sent to the local node (other shared copies being created while we try to kill them off, indicates high levels of contention for the line)

addr_ack_bk_sp indicates that the bgkill had to be re-sent to the whole system 4) stores that had to do a dclaim.

A store that hits an S/S1 state in the L2 will result in a dclaim being issued.

go_M_bk_np indicates that the dclaim was successful, but a background kill must be sent to the node afterward.

go_M_bk_sp indicates that the dclaim was successful, but a background kill must be sent to the whole system.

rty_np indicates that the dclaim must be re-sent to the node. If we see this response to a dclaim, either another cache is also trying to gain ownership, or the memory controller queues are full and the dclaim could not be accepted there.

rty_sp indicates that the dclaim must be re-sent to the whole system. rty_lost_claim_np and rty_lost_claim_sp indicate that another thread has gained ownership of the line for a store and this thread must invalidate it's copy of the line and start over (as if it had missed the cache) by sending a RWITM to the node or the whole system respectively. This indicates that many threads are storing to the line at the same time and there is a high level of contention, especially if there were one or more rty_np/rty_sp seen before the final lost claim.

Figure 4:
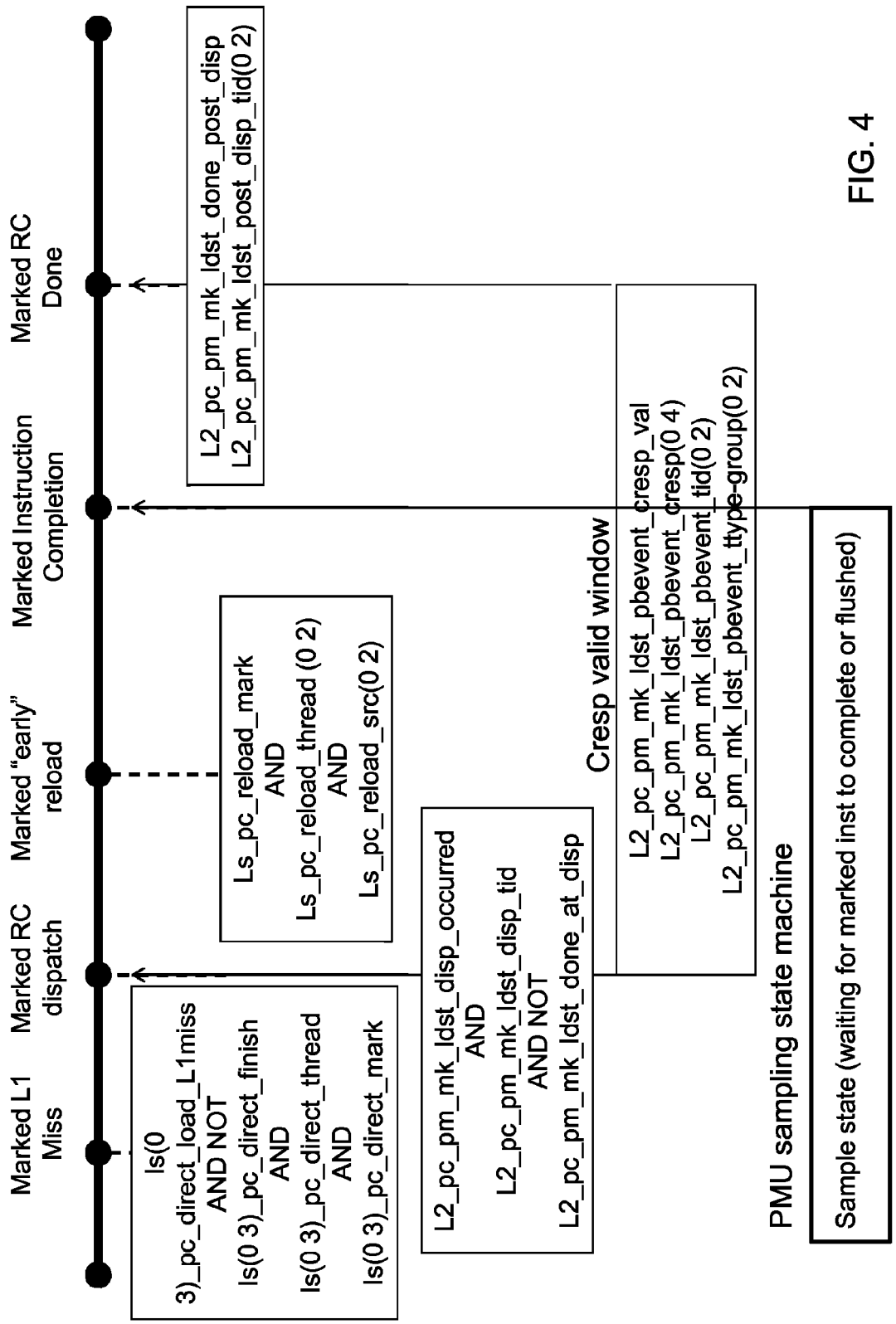
FIG. 4 is an example of a chart of a load lifetime.
Figure 5:
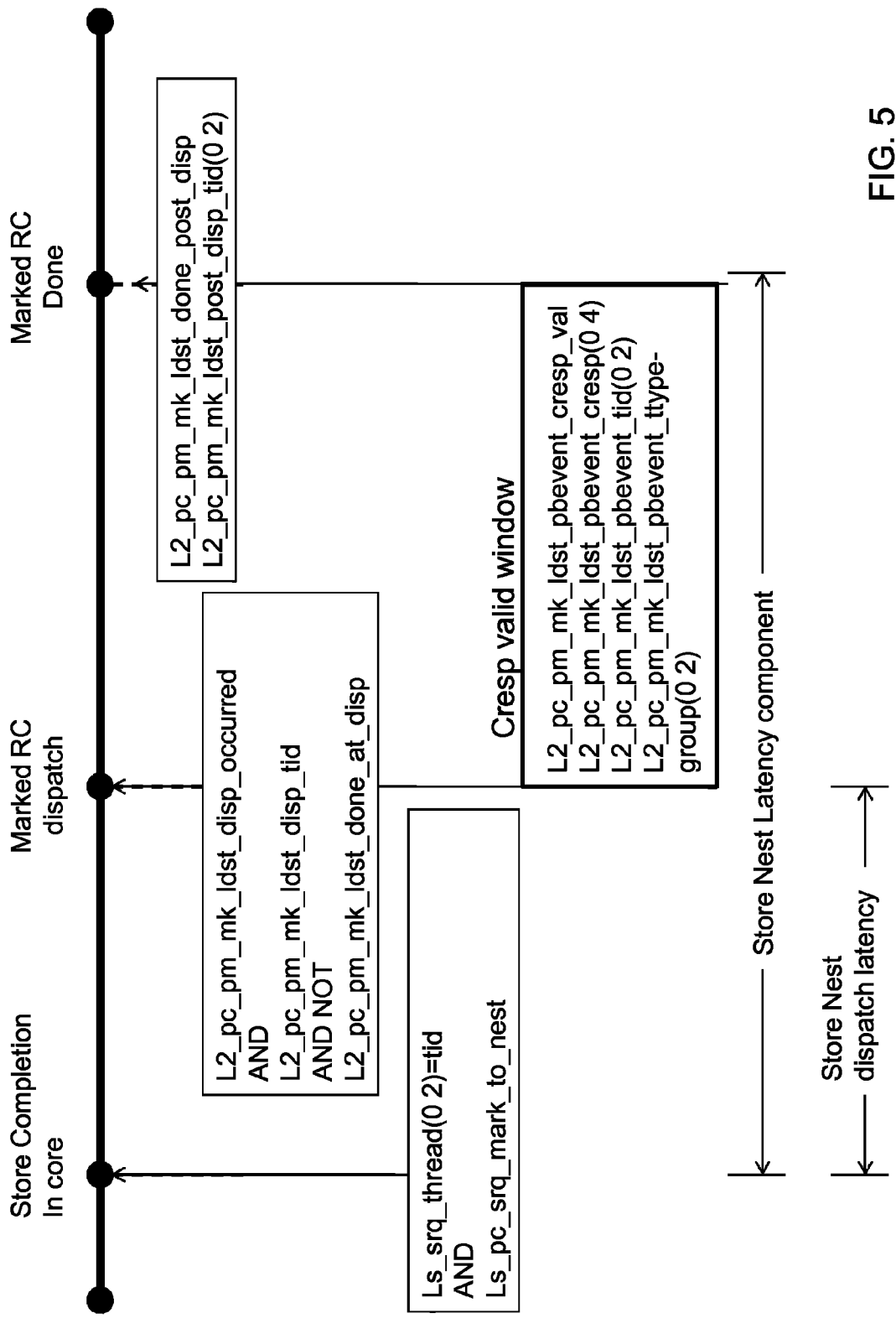
FIG. 5 is an example of a chart of a store lifetime.

Exemplary Load/Store Lifetimes are Shown in FIGS. 4 and 5.

Figure 6:
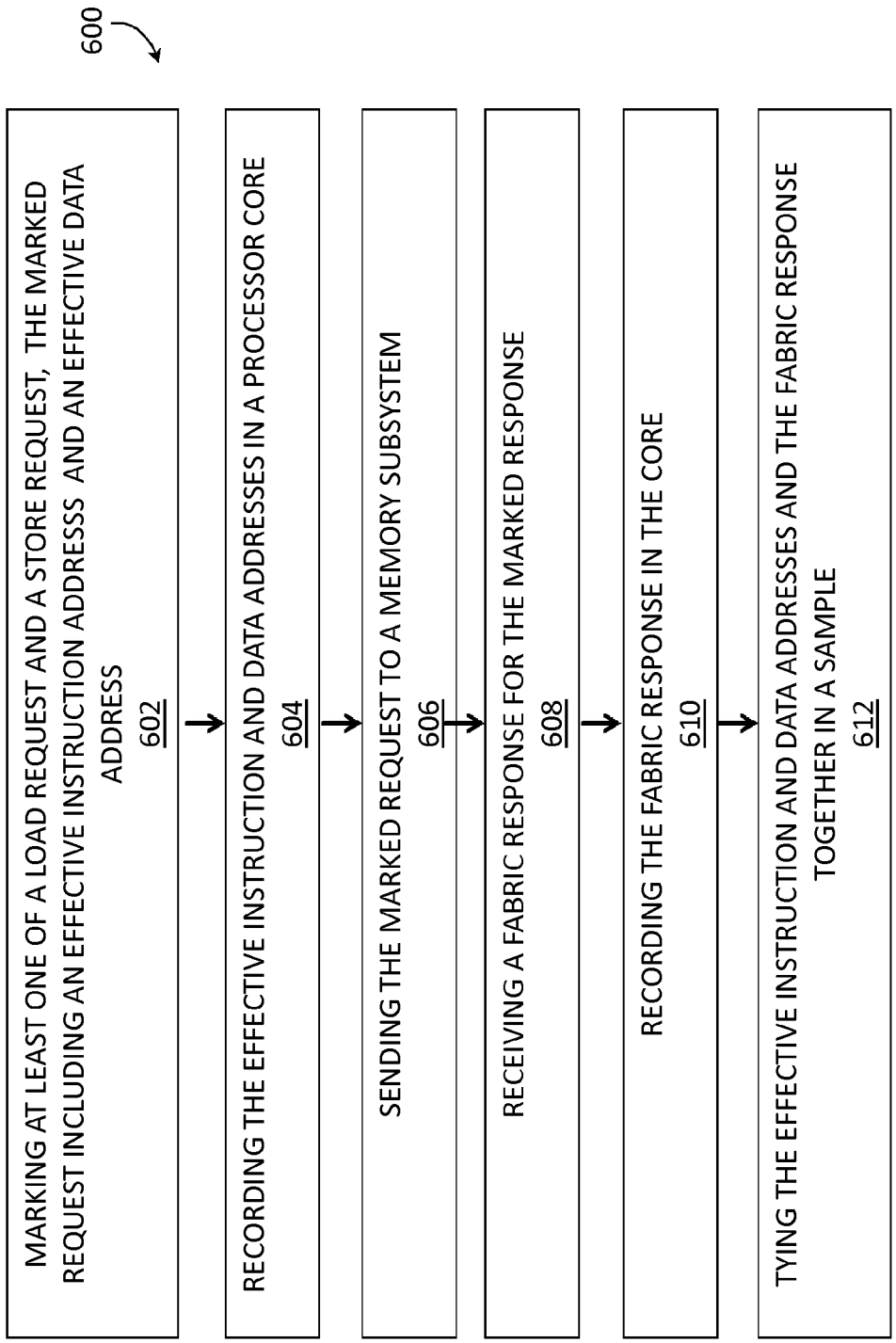
FIG. 6 is an example of a method of monitoring software performance in a computer.

Referring now to FIG. 6, an example of a software installation method 600 is shown. While FIG. 6 shows exemplary steps of a method according to one embodiment, other embodiments may omit, add to, and/or modify any of the steps shown in that figure. In step 602, at least one of a load request and a store request may be marked. The marked request may include an effective instruction address and an effective data address. In step 604, the effective instruction and data addresses may be recorded in a processor core. In step 606, the marked request may be sent to a memory subsystem. In step 608, a fabric response of the marked request may be received and in step 610, the fabric response may be recorded in the core. In step 612 the effective instruction and data addresses and the fabric response may be tied together in a sample Method 600 may include other steps. For example, method 600 may include determining, based on the sample, a contention issue of the marked request. Method 600 may further include identifying a location and a type of the contention issue. Additionally and/or alternatively, method 600 may include determining, based on the sample, at least one of a location and a type of a contention issue of the marked request. Additionally and/or alternatively, method 600 may include raising an interrupt of the marked request in response to the received fabric response.

Additionally and/or alternatively, method 600 may include recording the effective instruction address in a first special purpose register and/or recording the effective data address in a second special purpose register. Additionally and/or alternatively, method 600 may include recording the fabric response in a performance monitoring unit. Additionally and/or alternatively, method 600 may include starting a latency count in the processor and/or stopping the latency count in the processor.

Additionally and/or alternatively, the fabric response may include at least one of a combined response, a retry count, a latency count, a transaction type (T-type), data source and a data system reference code (SRC). Additionally and/or alternatively, the fabric response includes at least two of a combined response, a retry count, a latency count, a transaction type (T-type), data source and a data system reference code (SRC).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of monitoring software performance in a computer, the method comprising:
    marking at least one of a load request and a store request to create at least one marked request, the at least one marked request including an effective instruction address and an effective data address;
    recording the effective instruction address and the effective data address in a first processor core of a plurality of processor cores;
    sending the at least one marked request to a memory subsystem;
    receiving a fabric response for the at least one marked request, the fabric response including at least one of a combined response, a retry count, a latency count, a transaction type (T-type), a data source, and a data system reference code (SRC), wherein the latency count includes latency associated with the at least one marked request that is caused by one or more interventions and latency caused by one or more retries;
    recording the fabric response in the first processor core;
    tying the effective instruction address, the effective data address, and the fabric response together in a sample;
    determining, based on the sample, a contention issue of the at least one marked request on an inter-processor connection fabric that interconnects the plurality of processor cores; and
    identifying a location within a program code where the contention issue is occurring and a type of the contention issue.

2. The method of claim 1, wherein the fabric response is recorded in a performance monitoring unit.

3. The method of claim 1, wherein:
    the effective instruction address is recorded in a first special purpose register; and
    the effective data address is recorded in a second special purpose register.

4. The method of claim 1, further comprising:
    raising an interrupt of the at least one marked request in response to the received fabric response.

5. The method of claim 1, wherein the fabric response includes the SRC, and the method further comprising recording the SRC in a Status Interrupt Enable Register (SIER).

6. The method of claim 3, further comprising:
    in response to sending the at least one marked request to a memory subsystem, starting a latency count in the first processor core, wherein the latency count includes latency associated with the at least one marked request that is caused by one or more t interventions and latency caused by one or more retries; and
    in response to receiving, at the first processor core, a requested data that is associated with the at least one marked request, stopping the latency count;
    wherein the latency count is recorded in a Status Interrupt Enable Register (SIER), wherein the SIER is a special purpose register that is separate from the first special purpose register and the second special purpose register; and
    wherein a final resolution of the at least one marked request on the inter-processor connection fabric is forwarded to the first processor core independent of the first processor core receiving the requested data.

7. A computer program product for monitoring software performance in a computer, the computer program product comprising at least one non-transitory computer readable storage medium having computer readable program code embodied therewith, the computer readable program code, when read by a processor, being configured to:
    mark at least one of a load request and a store request to create at least one marked request, the at least one marked request including an effective instruction address and an effective data address;
    record the effective instruction address and the effective data address in a first processor core of a plurality of processor cores;
    send the at least one marked request to a memory subsystem;
    receive a fabric response for the at least one marked request, the fabric response including at least one of a combined response, a retry count, a latency count, a transaction type (T-type), a data source, and a data system reference code (SRC), wherein the latency count includes latency associated with the at least one marked request that is caused by one or more interventions and latency caused by one or more retries;
record the fabric response in the first processor core;
tie the effective instruction address, the effective data address, and the fabric response together in a sample;
determine, based on the sample, a contention issue of the at least one marked request on an inter-processor connection fabric that interconnects the plurality of processor cores; and
identify a location within a program code where the contention issue is occurring and a type of the contention issue.

8. The computer program product of claim 7, wherein:
the fabric response includes each of: the combined response, the retry count, the latency count, the transaction type (T-type), the data source, and the data system reference code (SRC).

9. The computer program product of claim 7, wherein the computer readable program code, when read by a processor, is further configured to:
record the effective instruction address in a first special purpose register; and
record the effective data address in a second special purpose register.

10. The computer program product of claim 7, wherein the computer readable program code, when read by a processor, is further configured to:
raise an interrupt of the at least one marked request in response to the fabric response.

11. The computer program product of claim 7, wherein the fabric response includes the SRC, and wherein the computer readable program code, when read by a processor, is further configured to record the SRC in a Status Interrupt Enable Register (SIER).

12. The computer program product of claim 9, wherein the computer readable program code, when read by a processor, is further configured to:
in response to sending the at least one marked request to a memory subsystem, start a latency count in the first processor core, wherein the latency count includes latency associated with the at least one marked request that is caused by one or more t interventions and latency caused by one or more retries; and
in response to receiving, at the first processor core, a requested data that is associated with the at least one marked request, stop the latency count;
wherein the latency count is recorded in a Status Interrupt Enable Register (SIER), wherein the SIER is a special purpose register that is separate from the first special purpose register and the second special purpose register; and
wherein a final resolution of the at least one marked request on the inter-processor connection fabric is forwarded to the first processor core independent of the first processor core receiving the requested data.

13. A computer comprising:
a processor;
a memory; and
a software performance monitoring program including a plurality of instructions stored in the memory that are executed by the processor to:
mark at least one of a load request and a store request to create at least one marked request, the at least one marked request including an effective instruction address and an effective data address;
record the effective instruction address and the effective data address in a first processor core of a plurality of processor cores;
send the at least one marked request to a memory subsystem;
receive a fabric response for the at least one marked request, the fabric response including at least one of a combined response, a retry count, a latency count, a transaction type (T-type), data source and a data system reference code (SRC), wherein the latency count includes latency associated with the at least one marked request that is caused by one or more t interventions and latency caused by one or more retries;
record the fabric response in the first processor core;
tie the effective instruction address, the effective data address, and the fabric response together in a sample;
determine, based on the sample, a contention issue of the at least one marked request on an inter-processor connection fabric that interconnects the plurality of processor cores; and
identify a location within a program code where the contention issue is occurring and a type of the contention issue.

14. The computer of claim 13, the plurality of instructions further includes instructions that are executed by the processor to:
record the fabric response in a performance monitoring unit.

15. The computer of claim 13, wherein the plurality of instructions further includes instructions that are executed by the processor to:
start a latency count in the processor; and
stop the latency count in the processor.

16. The computer of claim 13, wherein the plurality of instructions further includes instructions that are executed by the processor to:
raise an interrupt of the at least one marked request in response to the fabric response.

17. The computer of claim 13, the plurality of instructions further includes instructions that are executed by the processor to:
record the effective instruction address in a first special purpose register;
record the effective data address in a second special purpose register;
in response to sending the at least one marked request to a memory subsystem, start a latency count in the first processor core, wherein the latency count includes latency associated with the at least one marked request that is caused by one or more t interventions and latency caused by one or more retries; and
in response to receiving, at the first processor core, a requested data that is associated with the at least one marked request, stop the latency count;
wherein the latency count is recorded in a Status Interrupt Enable Register (SIER), wherein the SIER is a special purpose register that is separate from the first special purpose register and the second special purpose register; and
wherein a final resolution of the at least one marked request on the inter-processor connection fabric is forwarded to the first processor core independent of the first processor core receiving the requested data.

18. The computer of claim 14, the plurality of instructions further includes instructions that are executed by the processor to record the SRC in a Status Interrupt Enable Register (SIER).

* * * * *